(12) United States Patent
Koori

(10) Patent No.: US 6,268,889 B1
(45) Date of Patent: Jul. 31, 2001

(54) VIDEO SIGNAL PROCESSING APPARATUS AND SIGNAL TRANSMITTING METHOD

(75) Inventor: Teruhiko Koori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/921,927

(22) Filed: Aug. 27, 1997

(30) Foreign Application Priority Data

Sep. 2, 1996 (JP) .................................................. 8-251003

(51) Int. Cl.⁷ .............................. H04N 9/65; H04N 9/76; H04N 7/167; H04N 5/91
(52) U.S. Cl. ........................ 348/642; 348/599; 348/460; 380/201; 380/203; 380/204; 386/94
(58) Field of Search ..................................... 348/642, 646, 348/645, 651, 659, 601, 600, 599, 460, 475; 382/100, 201, 202, 203, 204, 205; 386/94; 380/3, 4, 5, 49, 54; 725/25, 31; H04N 19/76

(56) References Cited

U.S. PATENT DOCUMENTS

| | | | |
|---|---|---|---|
| 5,347,365 | * | 9/1994 | Harigai et al. ....................... 348/525 |
| 5,657,387 | * | 8/1997 | Mogi et al. ............................. 380/20 |
| 5,778,064 | * | 7/1998 | Kori et al. ................................ 380/5 |
| 5,940,134 | * | 8/1999 | Wirtz ..................................... 348/473 |
| 6,018,608 | * | 1/2000 | Sakashita et al. ........................ 386/1 |
| 6,078,360 | * | 6/2000 | Doornhein et al. .................. 348/473 |

* cited by examiner

Primary Examiner—Andrew Faile
Assistant Examiner—Vivek Srivastava
(74) Attorney, Agent, or Firm—Frommer Lawrence & Haug, LLP; William S. Frommer

(57) ABSTRACT

RGB signals and sync signals H and V are inputted from a personal computer or the like. Additional information is superimposed to a vertical blanking period of the R signal. A timing generating unit generates a sampling pulse on the basis of the sync signals. A data extracting unit extracts the additional information by using the pulse. Processes such as discrimination of a category of the additional information and a parity check are executed by an information decoding unit. A converter converts the RGB signals into an NTSC signal. VBI data and a copy prevention signal are formed in response to a decoded result of the information decoding unit. The VBI data and copy prevention signal are superimposed to the NTSC signal in adders.

9 Claims, 13 Drawing Sheets

Fig. 7

| b0 | b1 | b2 | b3 | b4 | b5 | b6 | b7 |
|----|----|----|----|----|----|----|----|
| 1  | 0  | 1  | 0  | 0  | 0  | 0  | P0 |

Word 0

| b0 | b1 | b2 | b3 | b4 | b5 | b6 | b7 |
|----|----|----|----|----|----|----|----|
| ASB | APS0 | APS1 | CGMS-A | CGMS-A | 0 | 1 | P1 |

Word 1

| APS0 | APS1 | DEFINITION |
|------|------|------------|
| 0 | 0 | APS OFF |
| 0 | 1 | PSP ON, Split Burst OFF |
| 1 | 0 | PSP ON, 2 Line Split Burst ON |
| 1 | 1 | PSP ON, 4 Line Split Burst ON |

| b4 | b3 | DEFINITION |
|----|----|------------|
| 0 | 0 | NOT-USED |
| 0 | 1 | COPY PERMISSION |
| 1 | 0 | COPY OF ONLY ONE GENERATION IS OK |
| 1 | 1 | COPY INHIBITION |

CGMS-A

| BIT 7 | BIT 8 | DEFINITION |
|---|---|---|
| 1 | 1 | COPY IS INHIBITED |
| 1 | 0 | COPY OF ONE GENERATION IS OK |
| 0 | 1 | NOT-USED |
| 0 | 0 | COPY IS OK |

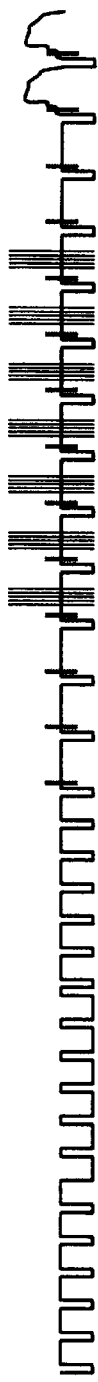
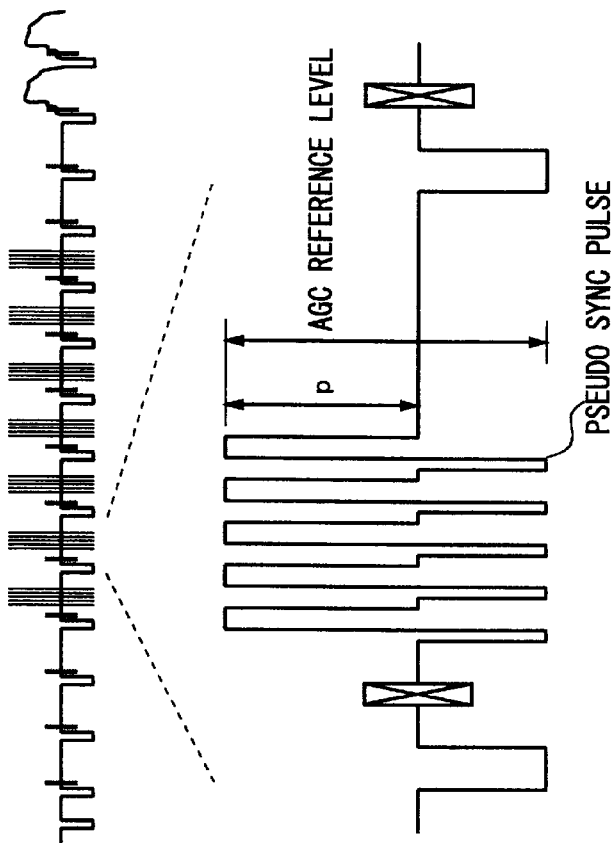
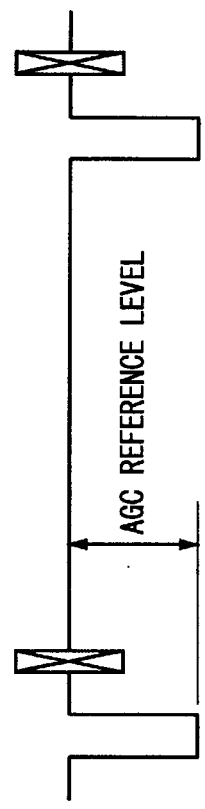
Fig. 12A
Fig. 12B
Fig. 12C

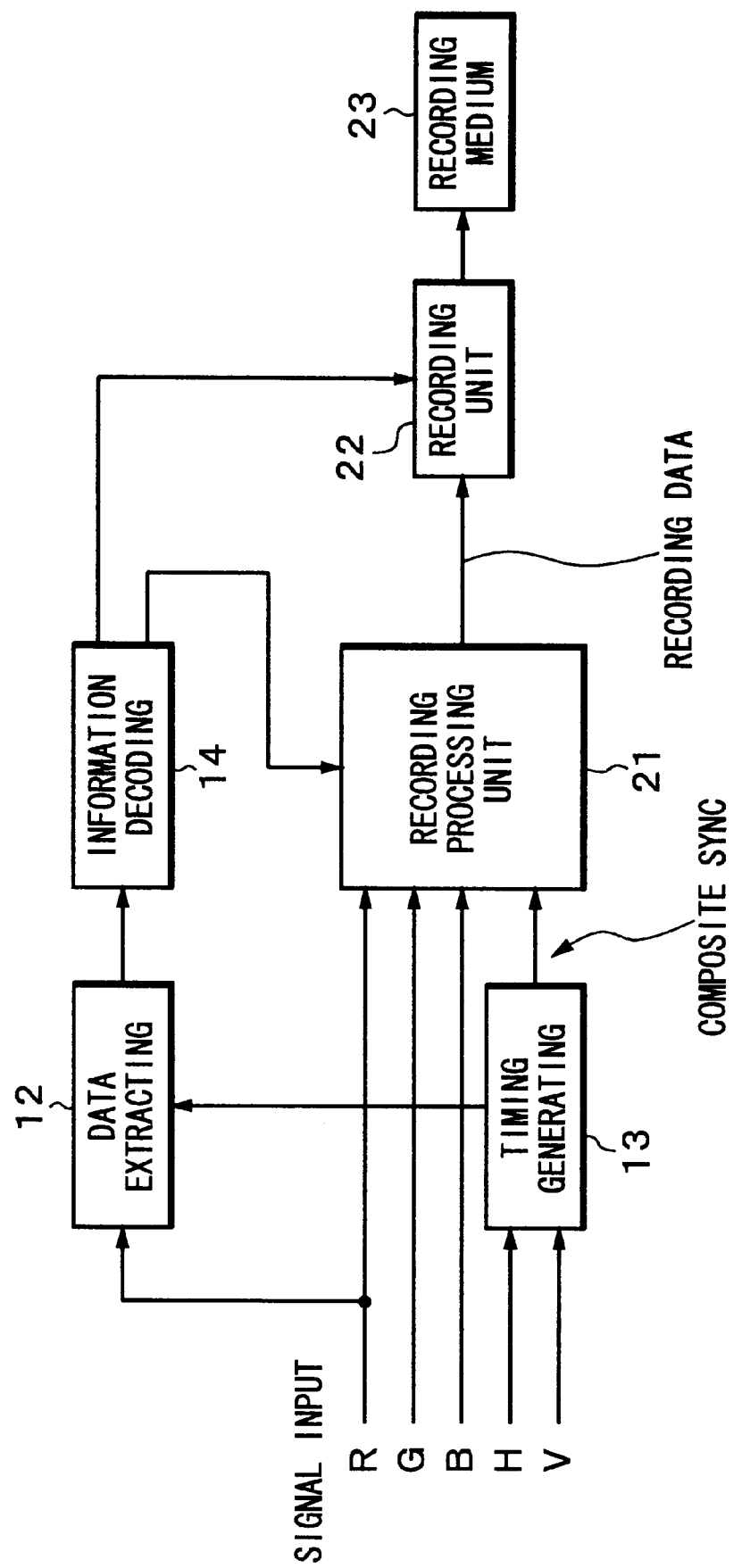

VIDEO SIGNAL PROCESSING APPARATUS AND SIGNAL TRANSMITTING METHOD

BACKGROUND OF THE INVENTION

1. Field of the Invention

The invention relates to a video signal processing apparatus and a video signal transmitting method whereby a component video signal of a form of an analog signal can include additional information of a form of a digital signal, for example, copy control information.

2. Description of the Related Art

Hitherto, various systems for superimposing digital additional information to an analog video signal have been made. For example, in a character multiplex broadcasting, a character broadcasting signal constructed by characters, figures, additional sounds, and the like is multiplexed to a horizontal scanning period in which no video signal exists in a vertical blanking period of a normal television radio wave. In order to transmit picture recording information in an analog VCR (video cassette tape recorder), there has also been proposed a system in which a digital signal of 20 bits is inserted in a predetermined horizontal scanning period within a vertical blanking period of a video signal and copy management information and information such as a date of picture recording and the like are transmitted by the digital signal (called VBI data or a video-ID).

Further, in these days when a video signal of a high picture quality can be provided by not only a prerecorded tape (soft tape) but also a terminal of a digital broadcasting and a disk medium such as a DVD or the like, a limitation of a copy by the analog VCR becomes a serious subject in order to protect a copyright. As systems other than the above-mentioned VBI data, a pseudo sync signal adding system and a split burst system have also been proposed as copy limiting systems. The pseudo sync signal adding system is a system such that an amplitude of a predetermined horizontal sync pulse which is included in the vertical blanking period and is detected as a level of a video signal by an AGC circuit is set to be larger than the normal amplitude and, when the AGC is made operative, an amplitude of an analog video signal is reduced to a small value of a degree such that the amplitude of the signal cannot be reproduced. The split burst system is a system such that a split burst signal in which a phase of a color burst signal has partially been inverted is added to a part of one picture plane.

Each of the above-mentioned character multiplex broadcasting and the additional information transmitting method of the VBI data or the like is a system for superimposing data to a predetermined horizontal scanning period in the vertical blanking period of the composite video signal having a form of an analog signal. Therefore, in case of transmitting an analog component signal, for example, three primary color signals (called RGB signals), such a system cannot be used. For instance, as a video output of a personal computer, a form of the RGB signals is generally used, so that the conventional proposed additional information transmitting system cannot be applied. Accordingly, there is a problem such that when an NTSC signal is formed by supplying analog RGB signals outputted from the personal computer to an NTSC encoder, since copy control information is not added to the NTSC signal, the NTSC signal is recorded by the analog VCR, so that the copy prevention cannot be accomplished.

OBJECTS AND SUMMARY OF THE INVENTION

It is, therefore, an object of the invention to solve the above problems and to provide a video signal processing apparatus and a video signal transmitting method whereby additional information such as copy control information or the like can be superimposed to an analog component color video signal.

According to the invention disclosed in claim 1, there is provided a video signal processing apparatus for processing a component color video signal of a form of an analog signal, comprising:

means for generating additional information of a form of a digital signal; and means for superimposing the additional information to at least one component signal of the component color video signal, wherein the component color video signal to which the additional information has been superimposed is outputted to a transmission channel.

According to the invention disclosed in claim 2, there is provided a video signal processing apparatus to which a component color video signal of a form of an analog signal in which additional information of a form of a digital signal has been superimposed to at least one component signal is inputted from a transmission channel, comprising:

means for forming a timing having a synchronous relation with the component color video signal;

means for extracting the additional information;

decoding means for decoding the extracted additional information; and a unit for responding to an output of the decoding means.

According to the invention disclosed in claim 21, there is provided a video signal transmitting method of transmitting a component color video signal, comprising the steps of superimposing additional information of a form of a digital signal to at least one component signal of the component color video signal; and transmitting the component color video signal to which the additional information has been superimposed through a transmission channel.

The additional information having a form of a digital signal, for example, copy control information can be superimposed to the component color video signal having a form of an analog signal. Consequently, it is possible to limit the copy of RGB signals which are outputted from, for example, a personal computer.

The above and other objects and features of the present invention will become apparent from the following detailed description and the appended claims with reference to the accompanying drawings.

BRIEF DESCRIPTION OF THE DRAWINGS

FIG. 7 is a schematic diagram showing a format of an example of the additional information;

FIGS. 12A to 12C are timing charts for explanation of a pseudo sync signal as an example of a copy prevention signal;

FIG. 16 is a block diagram showing another embodiment of a construction for processing RGB signals to which additional information has been superimposed.

DETAILED DESCRIPTION OF THE PREFERRED EMBODIMENTS

Figure 1:
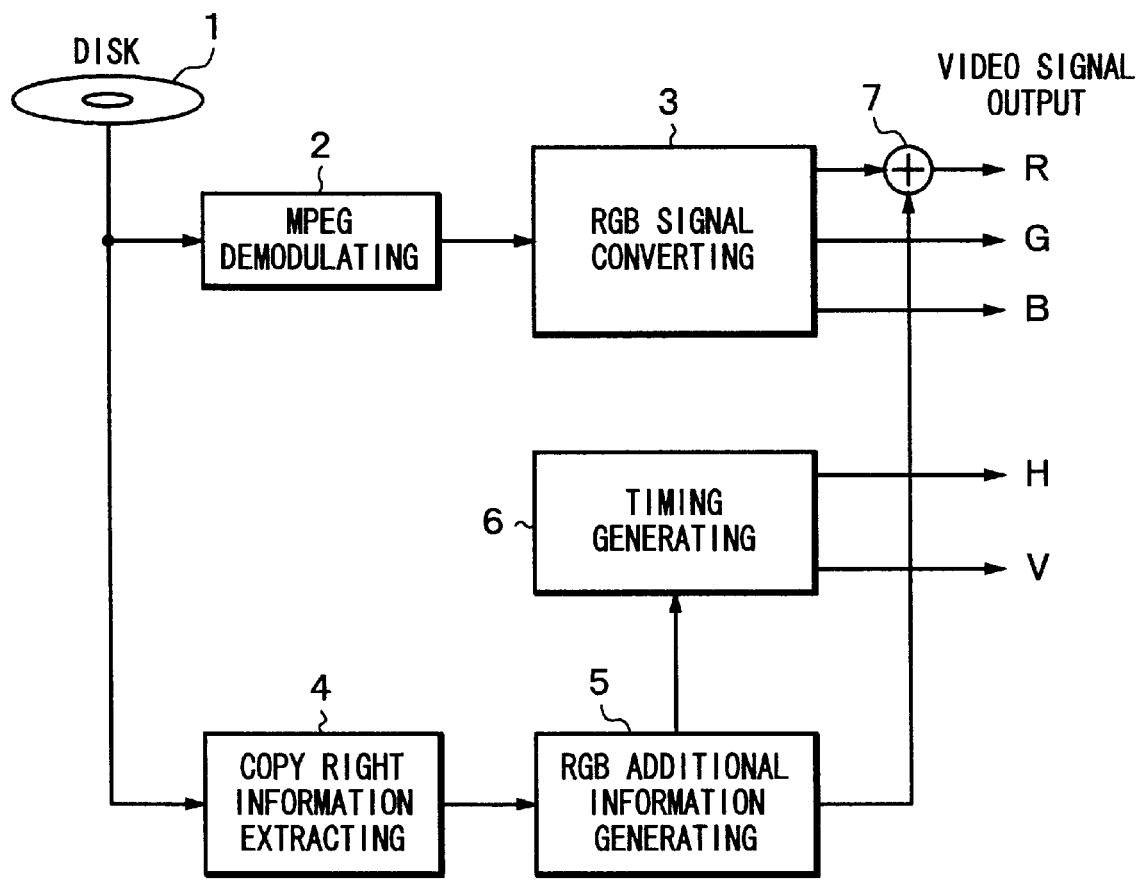
FIG. 1 is a block diagram showing an embodiment of a construction for superimposing additional information.

An embodiment of the invention will now be described. FIG. 1 shows an example of a construction for superimposing additional information, for example, copy control information to an analog component signal. For instance, a function for superimposing copy control information to output RGB signals can be realized by a disk player having an RGB output terminal or a personal computer in which a disk drive is connected to the inside or outside. A digital video signal has been high efficient coded and recorded on a disk medium 1 such as DVD, video CD, hard disk, or the like. For instance, the MPEG (Moving Pictures Expert Group) standard is used as a high efficient coding system.

The invention is not limited to a reproduction signal of the disk medium 1 but can be also applied to a reception signal of a digital television broadcasting, reception data from a network, or the like.

The disk medium 1 is reproduced by reading means (not shown) and a reproduction signal is supplied to an MPEG demodulating unit 2 and a copyright information extracting unit 4. The demodulating unit 2 demodulates the signal recorded by the MPEG standard and generates (Y, Cb, Cr) (Y: luminance signal, Cb, Cr: color difference signals) signals of (4:2:0), (4:2:2), or the like. An output signal of the demodulating unit 2 is supplied to an RGB signal converting unit 3. The RGB signal converting unit 3 converts the output signal of the MPEG demodulating unit 2 into analog RGB signals (R: red signal, g: green signal, B: blue signal).

The copyright information extracting unit 4 extracts copyright information from a data packet recorded on the disk medium 1. The extracted copyright information is supplied to an RGB additional information generating unit 5. A horizonal sync signal and/or a vertical sync signal from a timing generating unit 6 is supplied to the RGB additional information generating unit 5. The timing generating unit 6 generates various timings such as a reference timing of the rotation of the disk medium 1 and the like in addition to the sync signals. The horizontal and vertical sync signals formed by the timing generating unit 6 are synchronized with the RGB signals outputted from the RGB signal converting unit 3. The RGB additional information generating unit 5 converts the extracted copyright information into additional information of a digital signal of a format comprising word 0 and word 1 as will be explained hereinlater and supplies the additional information to an adder 7.

The R signal from the RGB signal converting unit 3 is supplied to the adder 7. Therefore, the additional information is superimposed to the R signal. The R signal to which the additional information has been superimposed, the G signal, the B signal, the horizontal sync signal H, and the vertical sync signal V are outputted to a transmission channel.

Figure 2:
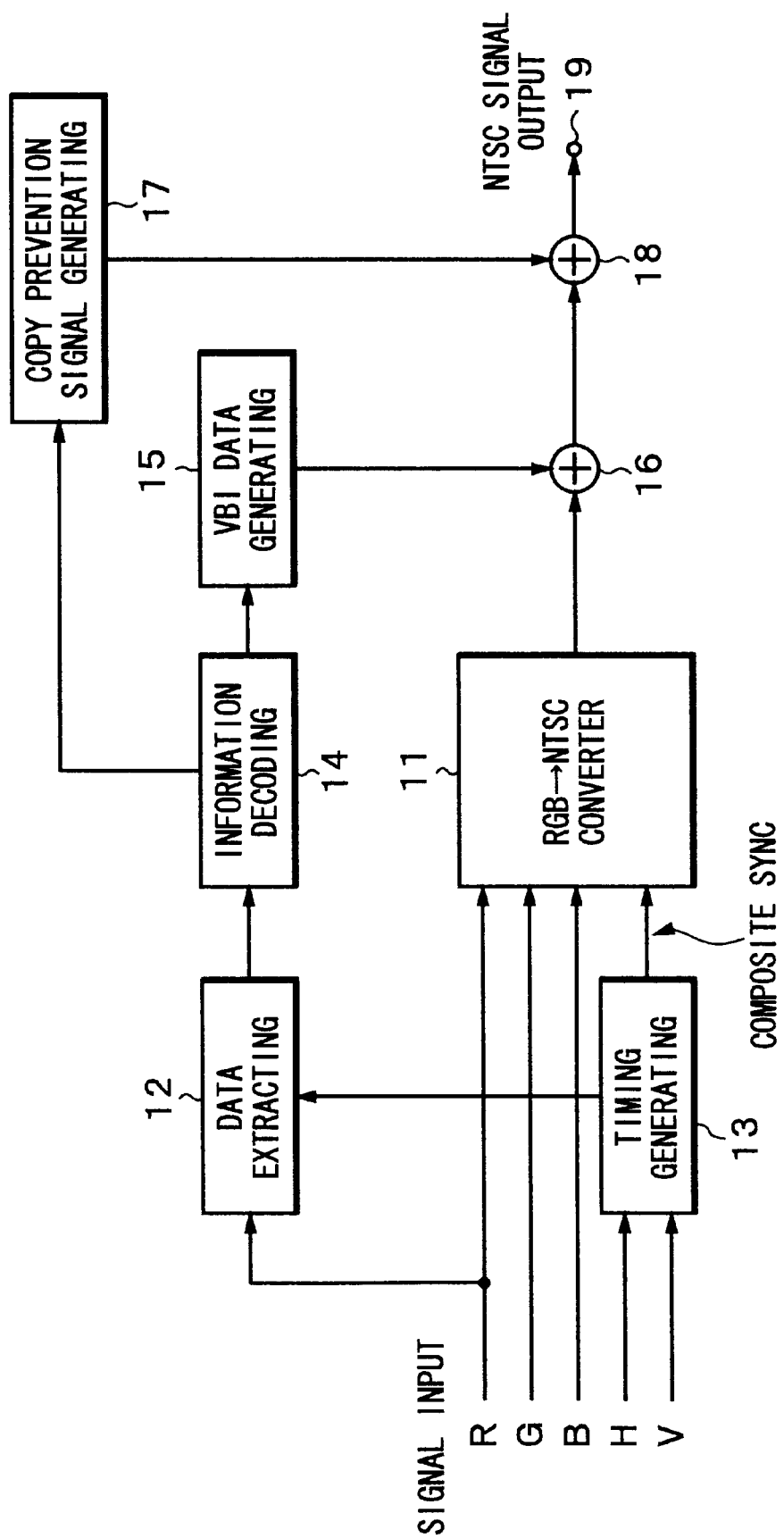
FIG. 2 is a block diagram showing an embodiment of a construction for processing RGB signals to which the additional information has been superimposed.

A unit for converting the RGB signals shown in FIG. 2 into the NTSC signal is connected to the transmission channel. The received RGB signals are supplied to an RGB-NTSC converter 11. The received R signal (to which the additional information has been superimposed) is supplied to a data extracting unit 12. The received sync signals H and V are supplied to a timing generating unit 13. The timing generating unit 13 discriminates polarities of the horizonal sync signal and the vertical sync signal, forms a sampling clock of the additional information, and generates a composite sync arranged in accordance with the standard of the NTSC system. The composite sync is supplied to the converter 11. A composite color video signal of a form of an analog signal of the NTSC system is outputted from the converter 11. As a composite signal, a composite signal of the PAL system or SECAM system can be also generated without limiting to the NTSC signal. Further, the invention can be applied to not only the case of the ordinary composite signal but also the case of generating a television signal of a format of a character multiplex broadcasting signal.

The data extracting unit 12 extracts the additional information superimposed to the R signal by using the sampling clock from the timing generating unit 13. The extracted additional information is supplied to an information decoding unit 14. In the example, the information decoding unit 14 decodes the additional information of the copyright information. More specifically, a discrimination about whether a header (word 0) of the additional information indicates the copyright information or not and a format confirmation comprising an error detection by a parity are executed. After the format was confirmed, the copyright information of word 1 is extracted. The information extracted by the information decoding unit 14 is supplied to a VBI data generating unit (VBI encoder) 15 and a copy prevention signal generating unit 17.

The VBI data generating unit 15 generates VBI data corresponding to the information from the information decoding unit 14. The VBI data is supplied to an adder 16 and superimposed to the NTSC signal from the converter 11. The copy prevention signal generating unit 17 generates a copy prevention signal corresponding to the decoded result from the information decoding unit 14. The VBI data and the copy prevention signal will be described in more detail hereinlater. The copy prevention signal is supplied to an adder 18 and superimposed to the NTSC signal. An analog NTSC signal to which the copy control information expressed by the additional information has been superimposed as VBI data and a copy prevention signal is taken out to an output terminal 19 of the adder 18. Although not shown, an analog VCR and a CRT monitor are connected to the output terminal 19.

Figure 3:
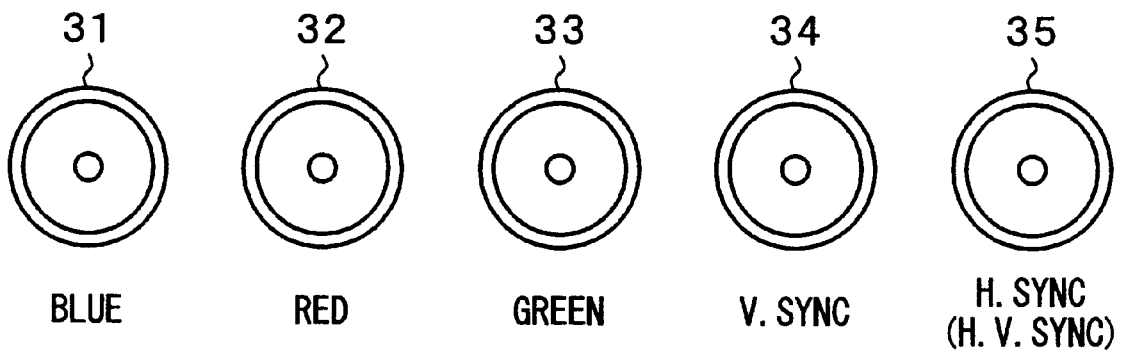
FIG. 3 is a schematic diagram showing an example of a connector for transmitting the RGB signals.

The foregoing embodiment of the invention will now be described further in detail. An example of a transmission channel for connecting the disk player or personal computer having the construction shown in FIG. 1 and the converting unit having the construction shown in FIG. 2 is shown in FIG. 3. FIG. 3 shows a BNC connector as one of connectors for connecting the RGB signals.

The BNC connector comprises five terminals 31 to 35 and those terminals are allocated to BLUE, RED, GREEN, V.SYNC, and H.SYNC (H.V.SYNC), respectively. The RGB signals are defined so that they have positive polarity and a standard level is equal to 0.7 Vp-p (at the time of a 75Ω termination). In accordance with a signal format (separate sync, sync on green, composite sync) of the RGB signals and the sync signals, the signals are inputted to the terminals 31 to 35 as shown in the following Table 1. In the Table 1, CSY denotes a composite sync.

TABLE 1

|  | BLUE 31 | RED 32 | GREEN 33 | V. SYNC 34 | H. SYNC 35 |
|---|---|---|---|---|---|
| SEPARATE SYNC | BLUE | RED | GREEN | VERTICAL SYNC | HORIZONTAL SYNC |
| SYNC ON GREEN | BLUE | RED | GREEN + CSY | — | — |
| COMPOSITE SYNC | BLUE | RED | GREEN | — | CSY |

Figure 4:
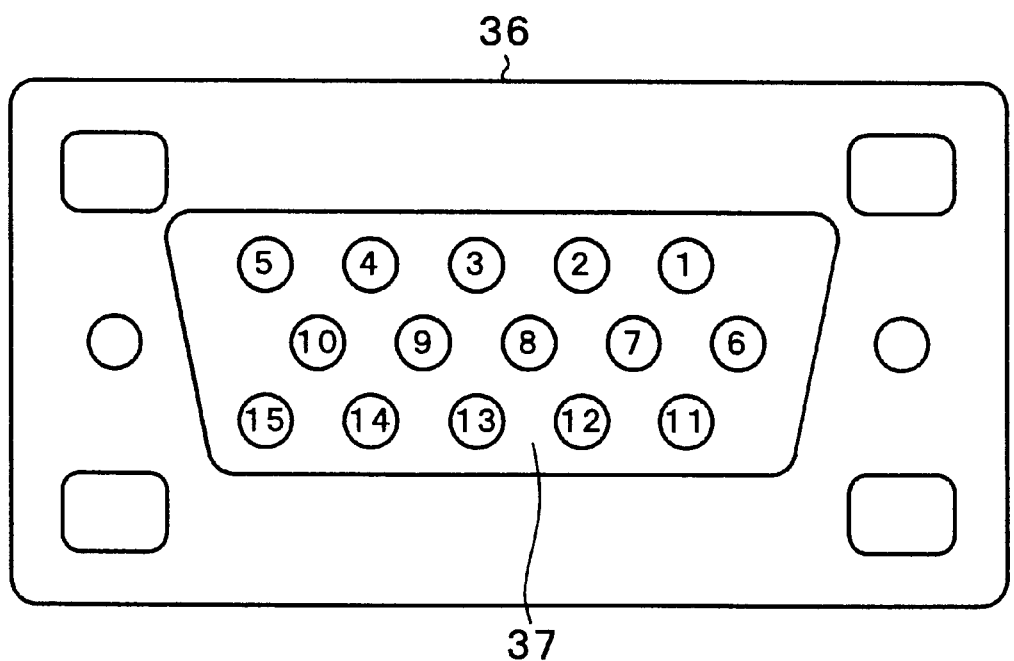
FIG. 4 is a schematic diagram showing another example of a connector for transmitting the RGB signals.

FIG. 4 shows another example of a connector adapted to the transmission of the RGB signals. This connector is called a D-SUB mini 15-pin connector and the signals are inputted to the pins with numbers as shown in the following Table 2.

TABLE 2

| PIN NO. | INPUT SIGNAL | PIN NO. | INPUT SIGNAL | PIN NO. | INPUT SIGNAL |
|---|---|---|---|---|---|
| 1 | RED | 6 | RED GROUND | 11 | GROUND |
| 2 | RED + CSY | 7 | GREEN GROUND | 12 | — |
| 3 | BLUE | 8 | BLUE GROUND | 13 | HORIZONTAL + CSY |
| 4 | GROUND | 9 | — | 14 | VERTICAL SYNC |
| 5 | — | 10 | GROUND | 15 | — |

In the examples of the connectors of FIGS. 3 and 4, there is a possibility such that the composite sync is superimposed to the G signal. In the embodiment, therefore, the additional information is superimposed to only the R signal. However, in accordance with a signal format, the additional information can be also superimposed to the G signal. Or, the additional information can be also superimposed to the two signals among the R, G, and B signals or to all of the signals. Further, the invention is not limited to the construction such that the same additional information is superimposed to each of the RGB signals but different additional information can be also superimposed in accordance with a component.

Figure 5:
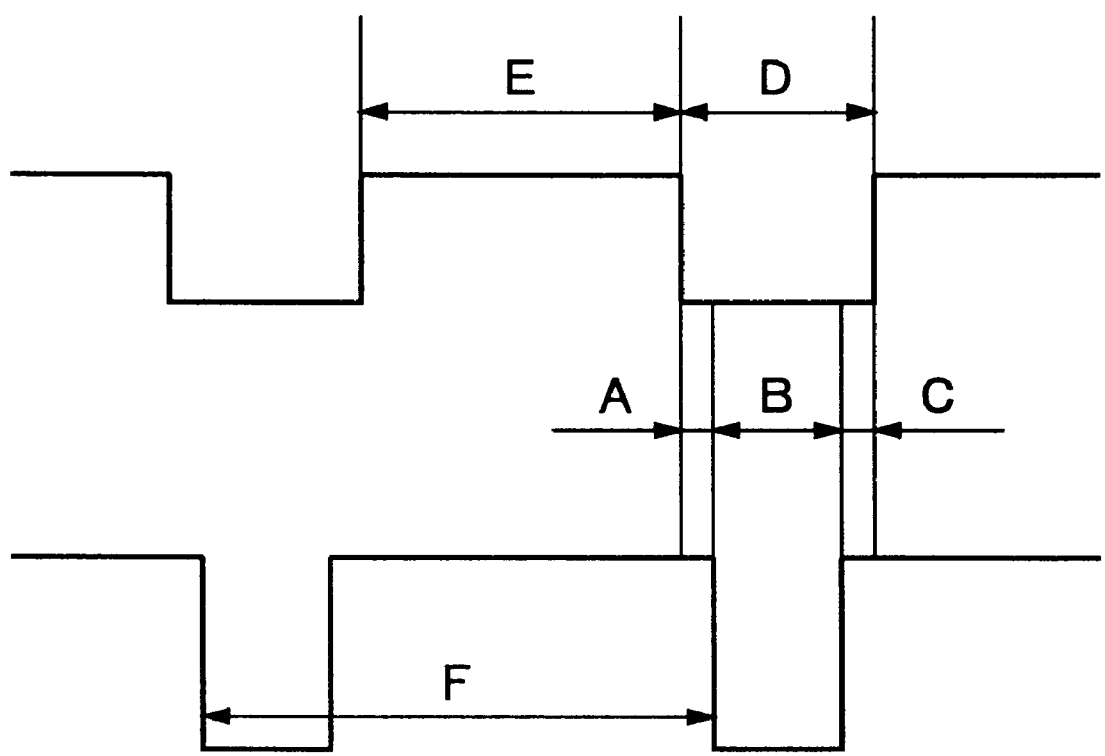
FIG. 5 is a timing chart of sync signals.

A construction such that the additional information is added to the R signal will now be described. An example of the sync signals which are transmitted by using the connector shown in FIG. 3 or 4 mentioned above will now be described. FIG. 5 is a timing chart of the sync signals. Each period shown in FIG. 5 is defined as shown below.

A: front porch, B: synchronization width, C: back porch, D: blanking period, E: display period, F: period.

For example, in case of the sync signals which are outputted by the personal computer, there are various specific numerical values of those periods. Although FIG. 5 shows the sync signals of the negative polarity, there is also a case where the sync signals of a positive polarity are used. Such an example (mode of 640 dots×480 lines) is shown below. In this example, the horizontal frequency is equal to 31.47 kHz, the vertical frequency is equal to 59.94 Hz, the horizontal sync signal has a negative polarity, and the vertical sync signal has a negative polarity.

TABLE 3

|  | A | B | C | D | E | F |
|---|---|---|---|---|---|---|
| HORIZONTAL SYNC SIGNAL [μS] | 0.636 | 3.813 | 1.907 | 6.356 | 25.422 | 31.778 |
| VERTICAL SYNC SIGNAL [μS] | 0.318 | 0.064 | 1.049 | 1.430 | 15.253 | 16.683 |

Figure 6:
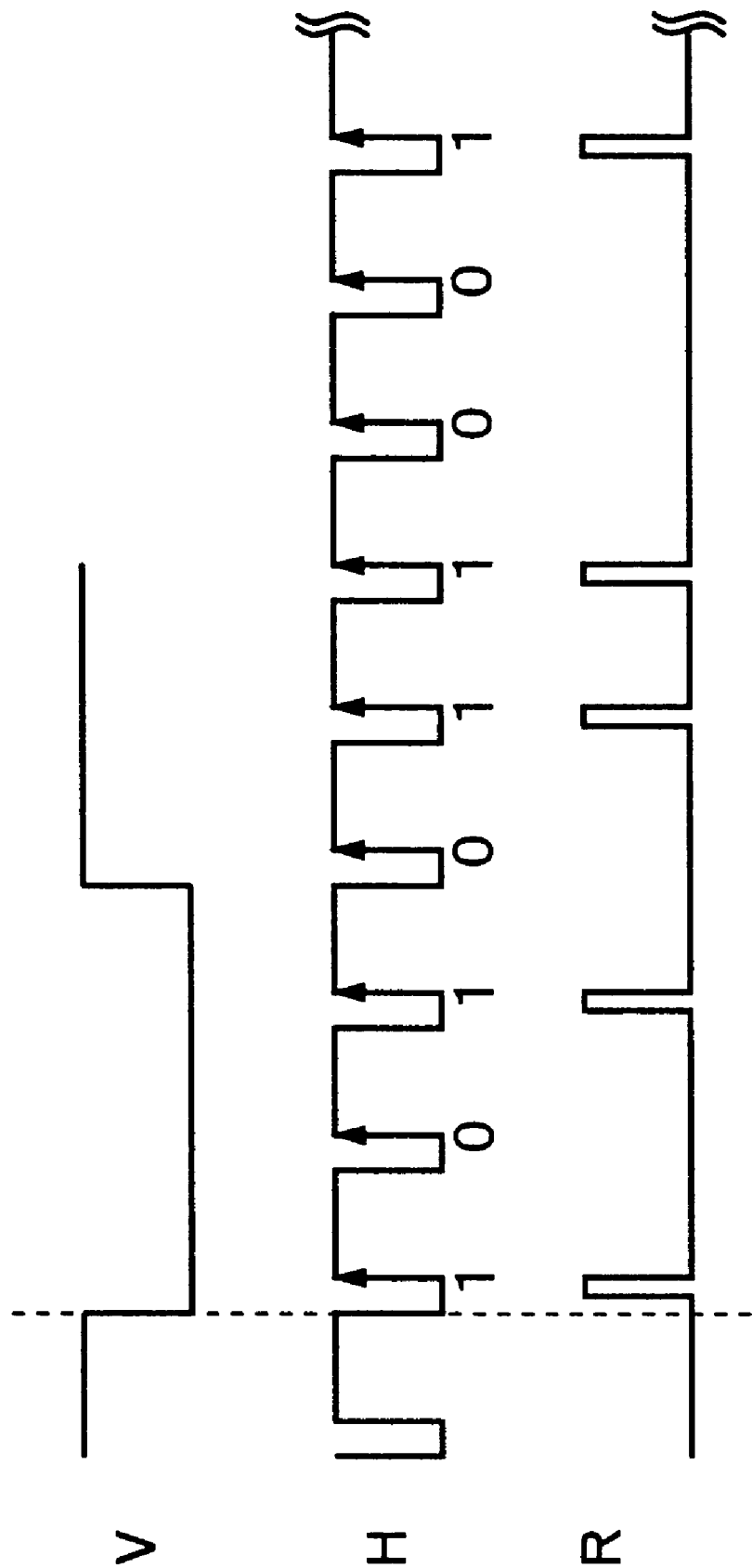
FIG. 6 is a timing chart when the additional information is superimposed to the R signal in case of using a negative polarity sync signal.

According to the embodiment of the invention, the additional information is superimposed to the vertical blanking period of the R signal synchronously with the sync signal, for example, the horizontal sync signal which is transmitted together with the RGB signals. FIG. 6 is a timing chart of an example of superimposing the additional information in the case where both of the vertical sync signal (V) and the horizontal sync signal (H) have the negative polarity. For instance, a front edge of the vertical sync signal is set to a start position and digital additional information (in the example shown in the diagram, 101011001 . . . ) is inserted into the vertical blanking period. A pulse signal corresponding to each bit of the additional information is inserted to the back side of the horizontal blanking period of each horizonal period.

A level of the pulse signal corresponding to bit "1" of the additional information is equal to, for example, the standard level [for instance, 0.7V (75Ω termination)] of the R signal. A level of a pulse signal corresponding to bit "0" is equal to 0V (75Ω termination). In the embodiment, a width of pulse signal doesn't exceed the horizontal blanking period and is selected so that the period of time during which the pulse signal is at the high level doesn't overlap the edge on the front side of the horizontal sync signal but overlaps the edge on the back side. The edge on the back side of the horizontal sync signal is not used as a reference of the synchronization of the horizontal sync signal and the back porch is generally longer than the front porch as shown in the foregoing example of the numerical values. Therefore, it is used as a strobe of the additional information or a timing of the reference of the sampling. Thus, the data extracting unit 12 in FIG. 2 samples each bit of the additional information by the sampling pulse which coincides with the edge on the back side of the horizonal sync signal formed by the timing generating unit 13.

An example of the additional information which is formed in the RGB additional information generating unit 5 in FIG. 1 will now be described with reference to FIG. 7. The additional information is made up of two words (word 0 and word 1). Each word comprises eight bits of b0 (LSB) to b7 (MSB). The additional information is sequentially transmitted in accordance with the order of word 0 and word 1 and is transmitted from the LSB of each word first of all. Odd number parity bits P0 and P1 are inserted as bit b7 of each word. The word 0 is a header (category code) and instructs a category of the information of word 1. The header (1010000) shown in the diagram indicates that word 1 is copyright information. Since the additional information has the header (word 0), digital data (for example, character code) other than the copyright information can be superimposed as additional information.

Bit b0 of word 1 is allocated to ASB (analog source bit). (ASB="0") denotes a digital source. (ASB="1") denotes an analog source. Two bits (b1, b2) are allocated to two bits APS0 and APS1 of an APS (analog protection system). As shown in FIG. 7, APS instructs a specific method of the APS together with the on/off of a copy limitation.

In the embodiment of the invention, a mode for generation of the copy prevention signal of the copy prevention signal generating unit 17 (refer to FIG. 2) is controlled by the decoded result of the APS. The turn-on of a PSP (pseudo synchronization) denotes that a system for adding the copy prevention signal including a pseudo sync signal is made operative. The turn-on of a split burst denotes that a system for adding a color burst signal in which an inverted burst signal is inserted in a part is made operative. As a split burst, two systems of 2-line split burst and a 4-line split burst are prepared and one of them can be selectively made operative.

Bits (b3, b4) of word 1 are allocated to the copyright information CGMS-A (Copy Generation Management System). A definition of those bits (b3, b4) is shown in FIG. 7 and is the same as that of the VBI data. The VBI data generating unit 15 (refer to FIG. 2) is controlled by the decoded result of the CGMS-A. The CGMS-A and APS are concerned with each other. For example, when the CGMS-A indicates "copy permission", the APS is turned off. When the CGMS-A indicates "copy of only one generation is OK", the APS is turned off. Data indicative of "copy inhibition" is formed as VBI data. The APS and the VBI data will be described in more detail hereinlater.

Figure 8:
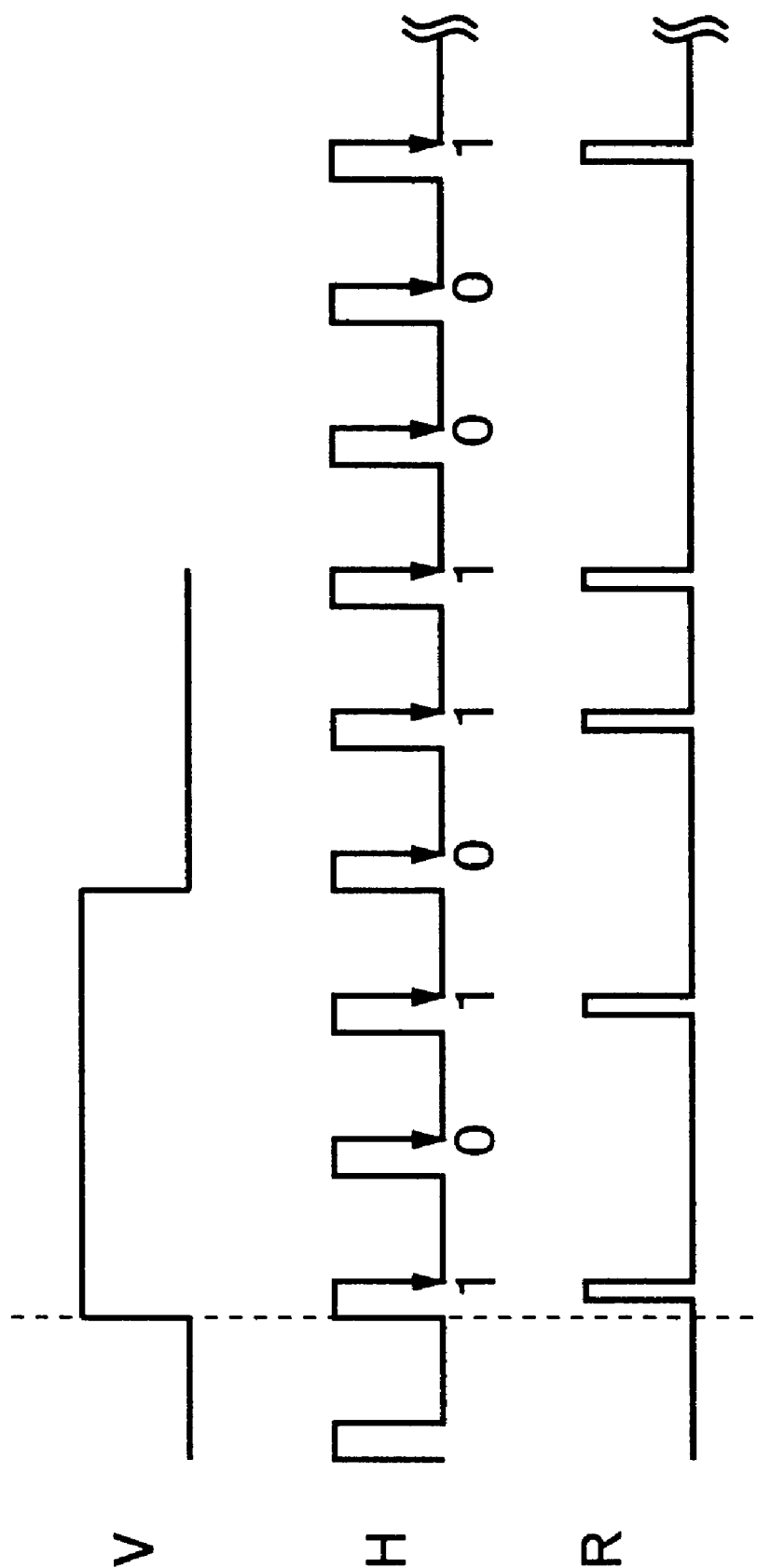
FIG. 8 is a timing chart when the additional information is superimposed to the R signal in case of using a positive polarity sync signal.

The format of the additional information mentioned above has a length of two words (16 bits) and can be transmitted in the vertical blanking period of the R signal. When the sync signals have the positive polarity, as shown in FIG. 8, each bit of the additional information is superimposed so that the sampling can be performed in response to the back side (trailing) edge of the horizontal sync signal. Further, in FIGS. 6 and 8, since each bit of the additional information has been superimposed to the horizontal blanking period, the additional information can be also superimposed in a period of time other than the vertical blanking period. Thus, more data can be transmitted.

Figure 9:
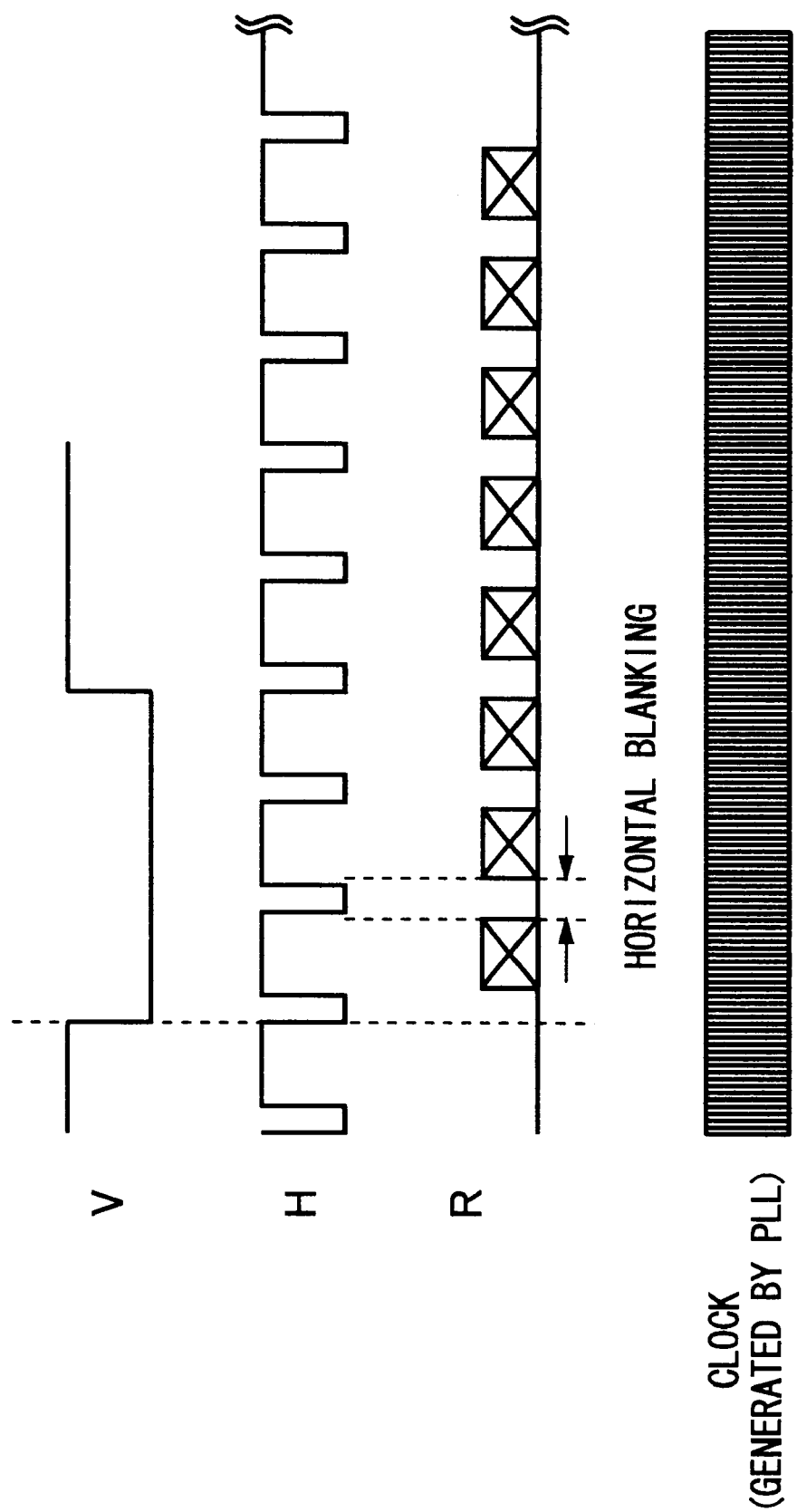
FIG. 9 is a timing chart when the additional information is superimposed to a display period of a vertical blanking period.

Further, in the vertical blanking period, as shown in FIG. 9, the additional information can be superimposed to the R signal for the display period (period of time except for the horizontal blanking period). Thus, further more additional information can be transmitted. That is, since a band of the RGB signals is assured within a range from tens of MHz to hundreds of MHz, a transmission rate of the additional information can be raised. In this case, a clock signal synchronized with the horizontal sync signal is generated by a frequency multiplying circuit constructed by a PLL and the generation and sampling of the additional information are executed by using the clock signal. A clock signal can be also formed from a dot clock in place of the horizontal sync signal.

Figure 10:
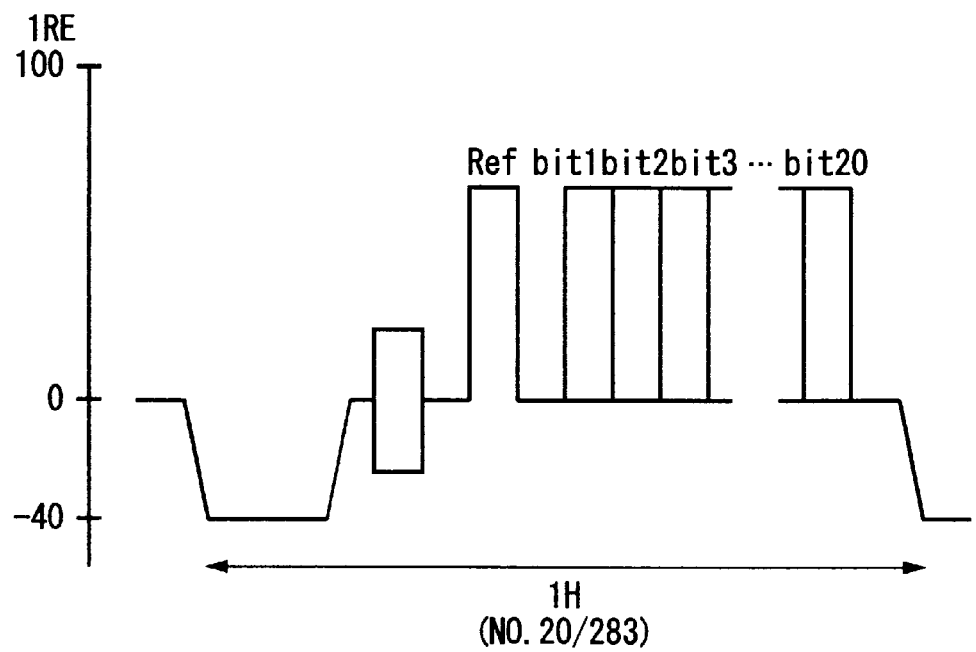
FIG. 10 is a timing chart for explanation of waveforms of VBI data.

As mentioned above, the VBI data generating unit 15 generates the VBI data in correspondence to the information of the copyright information CGMS-A in word 1 decoded by the information decoding unit 14. FIG. 10 shows a waveform of the VBI data. A reference of two bits and a digital signal of 20 bits (bit 1 to bit 20) are inserted into valid video signal areas after the horizontal sync signal and color burst signal. A level of reference is specified as 70IRE and a binary level of digital signal is specified as 0IRE or 70IRE. Now, assuming that a color subcarrier frequency is set to fsc, a clock frequency fc of the reference and the digital signal is selected to (fc=fsc/8≈447 kHz). The digital signal of 20 bits includes an identification signal of video signals of different aspect ratios and information regarding a transmitting method.

Figure 11:
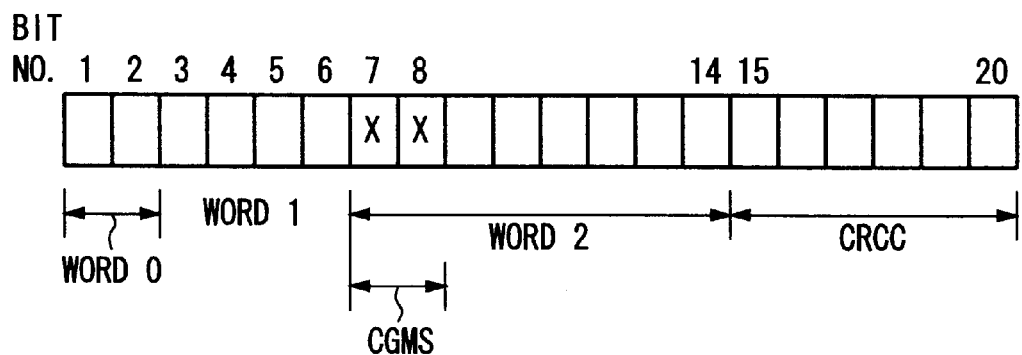
FIG. 11 is a schematic diagram for explanation of a format of the VBI data.

The copy control information is transmitted by using the foregoing VBI data. That is, a code allocation of the digital signal of 20 bits is performed as shown in FIG. 11. As shown in FIG. 11, the digital signal of 20 bits comprises: 14 information bits; and a CRC code (6 bits) for error detection for those 14 bits. Word 0 is made up of the first and second bits among the 14 bits. Word 1 is made up of four bits of the third to sixth bits. Word 2 is made up of eight bits of the seventh to 14th bits.

Word 0 (bit 1, bit 2) is information regarding the transmitting format of the video signal. Word 1 (bit 3, bit 4, bit 5, bit 6) is a header for designating information to be transmitted by word 2. (0000) of word 1 shows that information for a digital recording equipment is transmitted by word 2. In other words, when word 1 is set to (0000), the copy control information when recording and reproducing equipment are mutually connected and the copy is performed is transmitted by word 2.

For example, two bits (bit 7, bit 8) at the head among eight bits of word 2 have the contents to instruct a copy possible generation as shown in FIG. 11. In case of transmitting the information when word 1 is set to (0000), at least two or more frames are transmitted for two seconds. The copy control information is transmitted by those two bits (bit 7, bit 8). In case of the format shown in FIG. 7, bits b3 and b4 constructing the copyright information CGMS-A have the same definition as that of bits 7 and 8 of the VBI data.

As mentioned above, in response to the information of the APS (analog protection system) in word 1 decoded by the information decoding unit 14, the copy prevention signal generating unit 17 generates a copy prevention signal of the PSP (pseudo synchronization) system and a copy prevention signal of the split burst system.

In case of "copy inhibition", according to a pseudo sync pulse system, a pulse of a level larger than an ordinary AGC reference level is inserted in an AGC reference level detection interval. That is, a pseudo sync pulse is inserted to a part of the vertical blanking period of the video signal. For example, as shown in FIG. 12A, the pseudo sync pulse is inserted to a part of the vertical blanking period of the video signal. FIG. 12B enlargedly shows a portion in which the pseudo sync pulse has been inserted. As for the pseudo sync pulse, for example, five pulses are inserted at a level in which a level p is added to the horizontal sync pulse.

As an analog VCR, a number of recorders constructed so as to perform an AGC by using the horizontal sync pulse of 1H in the vertical blanking period shown in FIG. 12C exist. Therefore, when the pseudo sync pulse of an amplitude larger than that of the horizontal sync pulse is inserted as mentioned above, an AGC circuit determines that the amplitude of the pseudo sync pulse to be a reference level and performs the AGC. Thus, the level of the video signal after completion of the AGC becomes fairly small and the sync signal cannot be detected by an amplitude separation and a normal reproduction cannot be performed. On the other hand, since a television monitor has a different AGC system, a reproduction image can be normally displayed.

Since there is a case where an effect of the copy prevention due to the pseudo sync pulse system is insufficient in dependence on the kind of analog VCR, the split burst system is also used. This is because the split burst system is used to partially perform a phase inverting process to the color burst signal of a partial line in a valid picture plane. In the analog VCR, a carrier signal is converted to a low band carrier frequency and is recorded/reproduced. In the recording/reproducing step, a band limitation functions and a chrominance signal is strongly subjected to the band limitation function as compared with the television monitor.

Figure 13A:
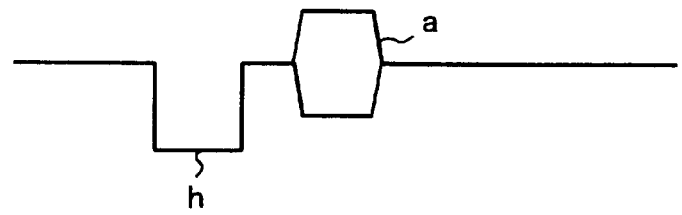
FIGS. 13A to 13B are waveform diagrams for explanation of a split burst signal as an example of the copy prevention signal.
Figure 13B:
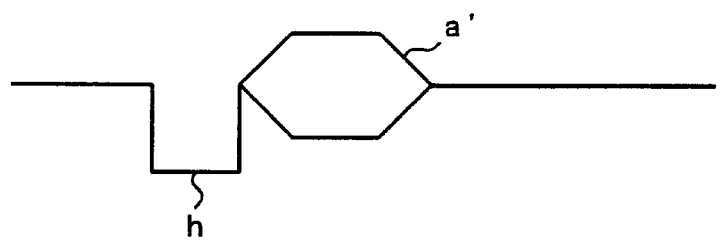

Therefore, the color burst signal in the reproduced video signal has a nature such that it is expanded to the front and back directions on a time base as compared with an original signal. FIGS. 13A and 13B show the color burst signals in the original signal and the signal after the reproduction by the VCR. When an original signal a of the color burst signal which is arranged after a horizontal sync signal h shown in FIG. 13A is recorded to a magnetic tape and is reproduced therefrom, a width of color burst signal a is expanded on the time base as shown in FIG. 13B.

Figure 14A:
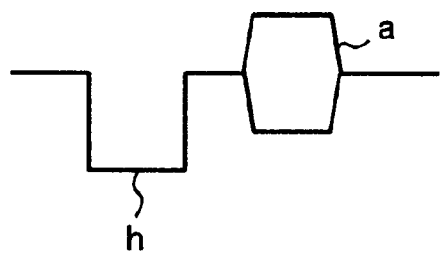
FIGS. 14A to 14D are waveform diagrams for explanation of the split burst signal as an example of the copy prevention signal.
Figure 14B:
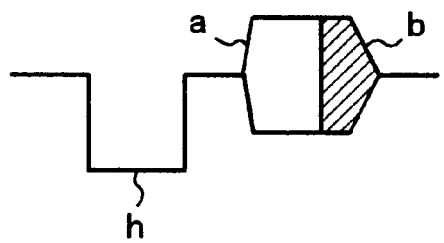
Figure 14C:
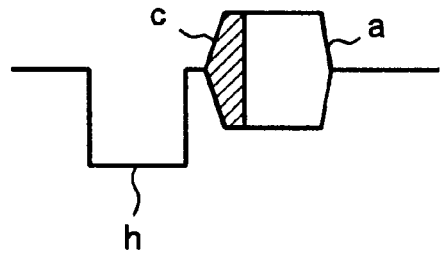
Figure 14D:
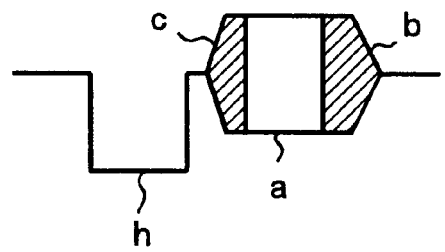

A system for preventing the copy by using the above nature is a split burst system. FIG. 14A shows an ordinary color burst signal a. The color burst signal a is made up of nine pulses. FIG. 14B shows an example in which an inverted burst signal b (shown by a hatched region) whose phase was inverted is inserted to the back side of the ordinary color burst signal a. FIG. 14C shows an example in which the inverted burst signal b is inserted to the front side of the original signal a. Further, FIG. 14D shows an example in which the inverted burst signals b and c are inserted before and after the original signal a. A period of the original signal a and a period of the inverted burst signal can also overlap. For example, in case of the example shown in FIG. 14C, the pseudo burst signal of two pulses exists on the further front side than the front edge of the original signal a of nine pulses, the pseudo burst signal of 3.5 pulses exists after the front edge, and the pseudo burst signal of total 5.5 pulses is added.

The insertion of the inverted burst signal mentioned above is periodically performed in one picture plane. For instance, about 20 lines are set to a period and two lines among them include the inverted burst signal. Such a system is a 2-line split burst system in which the turn-on is instructed by (APS0="0", APS1="1"). Among the period of time of about 20 lines, four lines include the inverted burst signal. Such a system is a 4-line split burst system in which the turn-on is instructed by (APS0="1", APS1="1"). The period of time during which the inverted burst signal is added and the number of lines are properly set or can be selected in consideration of the characteristics of the analog VCR and the characteristics of the television monitor which are concerned with the color burst signal.

Figure 15A:
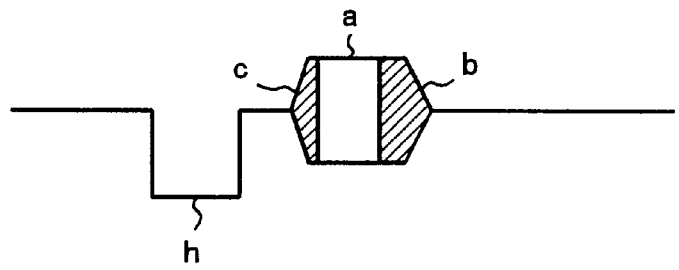
FIGS. 15A and 15B are waveform diagrams for explanation of the split burst signal as an example of the copy prevention signal.
Figure 15B:
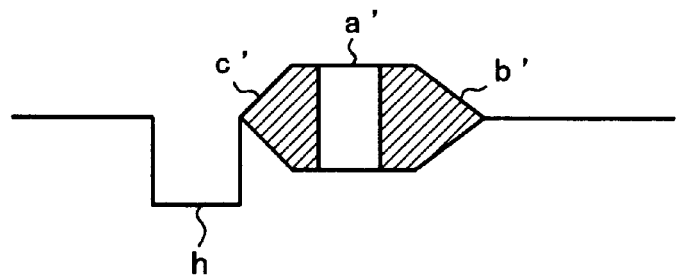

When the video signal to which the inverted burst signal was added is recorded or reproduced, the width of the inverted burst signal on the time base increases. In case of the example in which the inverted burst signals b and c are inserted to the front and back sides, after the color burst signal in which the inverted burst signal had been inserted as shown in FIG. 15A was recorded or reproduced, the width is expanded to the front and back sides as shown in a' and b' in FIG. 15B.

When the video signal including the color burst signal whose width was increased is intended to be reproduced by the VCR, the PLL of a color synchronizing circuit of the VCR cannot perform the normal operation due to the inverted burst signal and the image deteriorates. Thus, the copy can be prevented. On the other hand, in the television monitor, the video signal including the color burst signal including the inverted burst signal shown in FIG. 15A is detected as an almost normal color burst signal and is used. In this case, therefore, the image doesn't deteriorate. In this manner, the copy can be inhibited.

Although the RGB signals have been converted to the NTSC signal in the embodiment shown in FIG. 2, the invention can be also applied to a system which doesn't perform the conversion. Another embodiment shown in FIG. 16 has a construction such that the received RGB signals (to which the additional information has been superimposed) are converted into digital recording data by a recording processing unit 21 and is recorded to a recording medium 23 by a recording unit 22. A hard disk, a tape, an optical disk, or the like can be used as a recording medium 23. The recording unit 22 is constructed by a head, a pickup, or the like for recording data to those media.

In the construction of FIG. 16, the additional information extracted by the data extracting unit 12 is supplied to the information decoding unit 14 and the copyright information is decoded in a manner similar to the foregoing embodiment. When the result of the decoding indicates "copy inhibition", the recording unit 22 is controlled and the recording of the recording data is inhibited. On the contrary, when the decoding result indicates "copy permission", the recording data is recorded onto the recording medium 23. When the decoding result indicates "copy of only one generation is OK", the recording processing unit 21 is controlled so that the recording data is recorded onto the recording medium 23 and the copyright information included in the recording data is rewritten to "copy inhibition".

The invention can be also applied to a case of YUV signals as a component signal. Since the composite sync has been superimposed in the Y (luminance) signal in many cases, the additional information is superimposed to color difference signals (U and/or V).

According to the invention, the additional information such as copy control information or the like is superimposed to the analog component color video signal which is outputted from a personal computer or the like and can be transmitted. Therefore, a new function such as copyright protection or the like based on the additional information can be realized.

The present invention is not limited to the foregoing embodiments but many modifications and variations are possible within the spirit and scope of the appended claims of the invention.

What is claimed is:

1. A video signal processing apparatus for processing an analog component color video signal on which additional digital copy control information is superimposed, comprising:

means for forming a timing having a synchronous relation with said component color video signal;

means for converting the component color video signal into a composite color signal;

means for extracting said additional information;

decoding means for decoding said extracted additional information; and a unit for responding to an output of said decoding means, said unit for responding to said decoding means comprising means for generating a coded digital signal which is superimposed to a predetermined horizontal period in a vertical blanking period.

2. An apparatus according to claim 1, wherein said additional information is superimposed to a specific component signal of said component color video signal.

3. An apparatus according to claim 1, wherein said additional information is superimposed to all of the component signals of said component color video signal.

4. An apparatus according to claim 1, wherein said additional information is superimposed at a location specified by a timing synchronized with a horizontal or vertical sync signal.

5. An apparatus according to claim 4, wherein data of said additional information is detectable by an edge on the rear side of the horizontal or vertical sync signal.

6. An apparatus according to claim 4, wherein a clock signal multiplied by a PLL is generated from the horizontal sync signal and data of said additional information is detectable by said clock signal.

7. An apparatus according to claim 4, wherein a clock signal synchronized with a dot clock is generated and data of said additional information is detectable by said clock signal.

8. An apparatus according to claim 1, wherein said additional information is copy control information and said unit for responding to said decoding means is means for permitting/inhibiting a recording operation.

9. A video signal processing apparatus for processing an analog component color video signal on which additional digital copy control information is superimposed, comprising:

means for forming a timing having a synchronous relation with said component color video signal;

means for converting the component color video signal into a digital recording signal;

means for extracting said additional information;

decoding means for decoding said extracted additional information; and a unit for responding to an output of said decoding means, said unit for responding to said decoding means comprising means for rewriting copy control information in as a digital signal to at least one component signal of said component color video signal and;

transmitting said component color video signal on which said additional information has been superimposed through a transmission channel.

* * * * *